United States Patent
Kameda et al.

(10) Patent No.: US 6,878,452 B2
(45) Date of Patent: Apr. 12, 2005

(54) ROOM-TEMPERATURE CURABLE ORGANOPOLYSILOXANE COMPOSITION

(75) Inventors: Norio Kameda, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/442,958

(22) Filed: May 22, 2003

(65) Prior Publication Data

US 2003/0220443 A1 Nov. 27, 2003

(30) Foreign Application Priority Data

May 22, 2002 (JP) ........................................ 2002-147294

(51) Int. Cl.[7] .............................................. B32B 25/20
(52) U.S. Cl. ......................... 428/447; 528/901; 528/34; 156/329; 524/588
(58) Field of Search .................... 528/901, 34; 156/329; 524/588; 428/447

(56) References Cited

U.S. PATENT DOCUMENTS 6,218,461 B1 * 4/2001 Schwabe et al. ............ 524/588
6,485,838 B1 * 11/2002 Shimada et al. ............ 428/429

FOREIGN PATENT DOCUMENTS

JP          52-045655         *   4/1977

* cited by examiner

*Primary Examiner*—Kuo-Liang Peng
(74) *Attorney, Agent, or Firm*—Oblon, Spivak, McClelland, Maier & Neustadt, P.C.

(57) ABSTRACT

A room-temperature curable organopolysiloxane composition comprising a straight chain organopolysiloxane with hydroxyl groups and/or alkoxy groups at the terminals of the molecular chain, a ferrite such as a Ni—Zn-based ferrite, and a silane compound with hydrolysable groups such as alkenoxy groups, ketoxime groups or alkoxy groups, and/or a partial hydrolysis-condensation product thereof, produces a silicone rubber which displays excellent adhesion to substrates formed from synthetic resins such as acrylic resins, polyamide resins, polybutylene terephthalate, polystyrene and polyphenylene sulfide. The composition is useful as a sealing material, or as an adhesive for electrical components or electronic components.

11 Claims, No Drawings

ROOM-TEMPERATURE CURABLE ORGANOPOLYSILOXANE COMPOSITION

BACKGROUND OF THE INVENTION

1. Field of the Invention

The present invention relates to a room-temperature curable organopolysiloxane composition used as a sealing material, or as an adhesive for electrical components or electronic components, which produces a silicone rubber with excellent adhesion to a variety of synthetic resin substrates (that is, adherends).

2. Description of the Prior Art

Room-temperature curable silicone rubbers which undergo cross linking in the presence of moisture are easy to handle, and offer excellent weather resistance and electrical characteristics, and are consequently used in a variety of fields including as sealing materials for construction, and adhesives for bonding or securing electrical components or electronic components. In recent years, as the technology relating to the durability of synthetic resins has improved, the number of cases in which conventionally available room-temperature curable silicone rubbers will not bond well to substrates formed from these synthetic resins has increased.

Examples of methods of improving the adhesion of room-temperature curable silicone rubbers involve the incorporation of an adhesion improving agent such as an alkoxysilane with an aminoalkyl group such as 3-aminopropyltriethoxysilane or a silane compound with an oxime group and an alkoxy group (Japanese Post-Examination Patent publication (kokoku) No. 46-11272 (JP46-11272B), Japanese Post-Examination Patent publication (kokoku) No. 56-9560 (JP56-950B)). By incorporating this type of agent, the initial adhesion is improved, although on long term storage of the composition, the adhesion deteriorates.

Furthermore, methods of improving the adhesion by incorporating a specific filler have also been proposed (Japanese Patent publication No. 3146192 (JP3146192B), Japanese Laid-open publication (kokai) No. 10-168320 (JP10-168320A), Japanese Laid-open publication (kokai) No. 10-316811 (JP10-316811A)). Because these fillers comprise mainly water absorbent calcium carbonate, the moisture content must be removed from the calcium carbonate either prior to, or during the addition of the filler to the room-temperature curable silicone rubber, which undergoes cross linking in the presence of moisture, and the increased complexity of the process is not particularly desirable.

A room-temperature curable composition in which 0.001 to 10 parts by weight of an iron oxide ferrite is added per 100 parts by weight of a base polymer to improve heat resistance of the cured rubber has also been proposed (Japanese Laid-open publication (kokai) No. 52-45655 (JP52-45655A)). However, the quantity of the ferrite is so small that the ferrite is not effective very much in improvement of adhesion to the synthetic resin substrates.

SUMMARY OF THE INVENTION

An object of the present invention is to provide a room-temperature curable organopolysiloxane composition which produces a silicone rubber with a markedly improved adhesion to synthetic resins, which does not rely on the somewhat problematic techniques described above.

In other words, in order to achieve the above object, the present invention provides a room-temperature curable organopolysiloxane composition comprising:

(A) 100 parts by weight of at least one straight chain organopolysiloxane selected from the group consisting of a straight chain organopolysiloxane represented by a general formula (1) shown below and a straight chain organopolysiloxane represented by a general formula (2) shown below,

(wherein, each $R^1$ represents, independently, an unsubstituted or substituted monovalent hydrocarbon group, and n represents a number which results in a viscosity at 25° C. for this organopolysiloxane within a range from 25 to 1,000,000 mm$^2$/s),

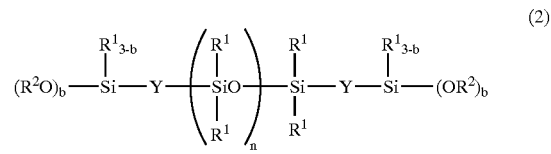

(wherein, $R^1$ is as defined above, each $R^2$ represents, independently, a monovalent hydrocarbon group or an alkoxy substituted monovalent hydrocarbon group, Y represents an oxygen atom or a bivalent hydrocarbon group, b represents either 2 or 3, and n represents a number which results in a viscosity at 25° C. for this organopolysiloxane within a range from 25 to 1,000,000 mm$^2$/s);

(B) 20 to 1000 parts by weight of a ferrite; and (C) 0.1 to 30 parts by weight of a silane compound with at least 3 hydrolysable groups bonded to silicon atoms within each molecule, and/or a partial hydrolysis-condensation product thereof.

DETAILED DESCRIPTION OF THE PREFERRED EMBODIMENTS

As follows is a more detailed description of the present invention.

Constituent (A)

The constituent (A) of the present invention uses at least one organopolysiloxane selected from the group consisting of a straight chain organopolysiloxane represented by a general formula (1) shown above and a straight chain organopolysiloxane represented by a general formula (2) shown above.

In the straight chain organopolysiloxane represented by the general formula (1), each $R^1$ in the formula represents, independently, an unsubstituted or substituted monovalent hydrocarbon group, preferably of 1 to 10 carbon atoms, and even more preferably of 1 to 8 carbon atoms. Specific examples include alkyl groups such as methyl groups, ethyl groups, propyl groups, butyl groups, pentyl groups, hexyl groups, heptyl groups, octyl groups, nonyl groups, decyl groups and octadecyl groups; cycloalkyl groups such as cyclopentyl groups and cyclohexyl groups; alkenyl groups such as vinyl groups and allyl groups; aryl groups such as phenyl groups, tolyl groups, xylyl groups and naphthyl groups; aralkyl groups such as benzyl groups, phenethyl groups and phenylpropyl groups; and groups in which at least a portion of the hydrogen atoms of the aforementioned groups have been substituted with halogen atoms or cyano groups (for example, halogenated alkyl groups such as 3-chloropropyl groups and 3,3,3-trifluoropropyl groups), although methyl groups, phenyl groups, vinyl groups and 3,3,3-trifluoropropyl groups are preferred, and methyl groups are particularly preferred.

Furthermore, n in the formula (1) represents a number which results in a viscosity at 25° C. for this organopolysiloxane within a range from 25 to 1,000,000 mm²/s, and preferably from 100 to 500,000 mm²/s, and even more preferably from 700 to 100,000 mm²/s. If the viscosity is lower than 25 mm²/s, the mechanical strength of the cured product is unsatisfactory, whereas in contrast, if the viscosity exceeds 1,000,000 mm²/s, the workability of the composition deteriorates.

Specific examples of the diorganopolysiloxane represented by the general formula (1) above include those compounds represented by the general formulas shown below, although the present invention is not restricted to the formulas listed here. In the formulas below, Ph represents a phenyl group.

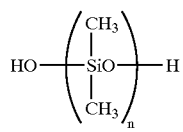

(wherein n represents a number which results in a viscosity at 25° C. for this diorganopolysiloxane of 25 to 1,000,000 mm²/s)

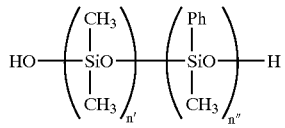

(wherein n' represents a number of 0 or greater, n" represents a number of 1 or greater, and n'+n" represents a number which results in a viscosity at 25° C. for this diorganopolysiloxane of 25 to 1,000,000 mm²/s)

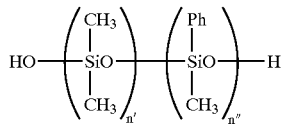

(wherein n' represents a number of 0 or greater, n" represents a number of 1 or greater, and n'+n" represents a number which results in a viscosity at 25° C. for this diorganopolysiloxane of 25 to 1,000,000 mm²/s)

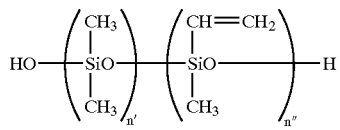

(wherein n' represents a number of 0 or greater, n" represents a number of 1 or greater, and n'+n" represents a number which results in a viscosity at 25° C. for this diorganopolysiloxane of 25 to 1,000,000 mm²/s)

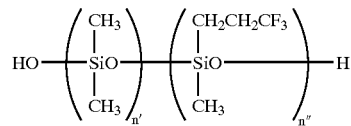

(wherein n' represents a number of 0 or greater, n" represents a number of 1 or greater, and n'+n" represents a number which results in a viscosity at 25° C. for this diorganopolysiloxane of 25 to 1,000,000 mm²/s)

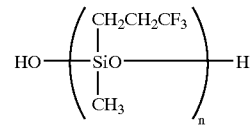

(wherein n represents a number which results in a viscosity at 25° C. for this diorganopolysiloxane of 25 to 1,000,000 mm²/s)

These compounds may be used singularly, or in combinations of two or more compounds.

Next, in the straight chain organopolysiloxane represented by the general formula (2), each $R^1$ in the formula is, independently, as per the definition of $R^1$ in the general formula (1) above. Furthermore, each $R^2$ preferably represents, independently, a monovalent hydrocarbon group of 1 to 4 carbon atoms, or an alkoxy substituted version of such a hydrocarbon group. Specific examples include methyl groups, ethyl groups, propyl groups, butyl groups, vinyl groups, methoxyethyl groups, ethoxyethyl groups and methoxypropyl groups, although methyl groups and ethyl groups are preferred. Y represents an oxygen atom or a bivalent hydrocarbon group such as $-CH_2-$, $-CH_2CH_2-$ and $-CH_2CH_2CH_2-$. Of these, oxygen atoms and $-CH_2CH_2-$ groups are particularly preferred.

Furthermore, in the general formula (2), n represents a number as per the definition of n in the general formula (1) above.

Specific examples of the diorganopolysiloxane represented by the general formula (2) above include those compounds represented by the general formulas shown below, although the present invention is not restricted to the formulas listed here.

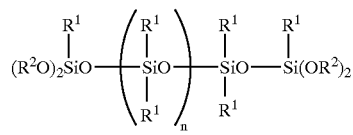

(wherein $R^1$ and $R^2$ are groups as per the definitions above, and n represents a number which results in a viscosity at 25° C. for this diorganopolysiloxane of 25 to 1,000,000 mm²/s (these definitions also apply to the formulas below))

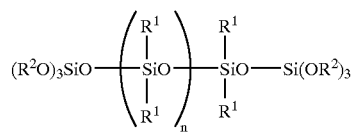

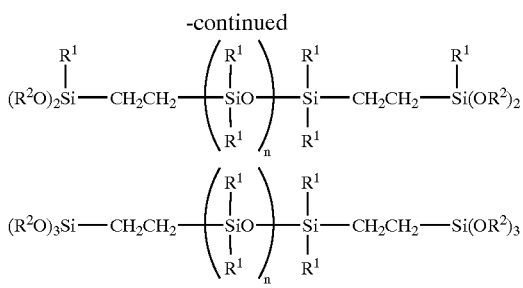

Constituent (B)

The ferrite of the constituent (B) is added to impart adhesion of the composition of the present invention to substrates formed from synthetic resins.

Examples of the ferrite include soft magnetic ferrites and hard magnetic ferrites. There are no particular restrictions on the soft magnetic ferrite, and suitable examples include complex ferrites of Zn ferrite such as Mn—Zn ferrite, Ni—Zn ferrite, Cu—Zn ferrite, and Ni—Zn—Cu ferrite. Similarly, there are no particular restrictions on the hard magnetic ferrite, and suitable examples include OP magnets which are a solid solution of Co ferrite and $Fe_3O_4$, barium ferrite magnets with a composition of $BaO.6Fe_2O_3$ and a magnetoplumbite structure, ferroxplana, and rare earth element iron garnets (such as YIG, TaG and GGG). These compounds may be used singularly, or in combinations of two or more compounds. There are no particular restrictions on the form of the ferrite, and spherical, fiber-like and irregular forms can all be used.

The quantity of the constituent (B) used is within a range from 20 to 1000 parts by weight, preferably from 50 to 900 parts by weight, and more preferably from 100 to 800 parts by weight, per 100 parts by weight of the aforementioned constituent (A). If the quantity is less than 5 parts by weight then a satisfactory level of adhesion cannot be imparted, whereas if the quantity exceeds 1000 parts by weight, the silicone rubber loses flexibility.

Constituent (C)

The silane compound with at least 3 hydrolysable groups bonded to silicon atoms within each molecule, and/or the partial hydrolysis condensation product thereof, which acts as the constituent (C), functions as a cross linking agent.

Examples of the hydrolysable groups include alkoxy groups such as methoxy groups, ethoxy groups and propoxy groups; alkoxyalkoxy groups such as methoxyethoxy groups, ethoxyethoxy groups and methoxypropoxy groups; acyloxy groups such as acetoxy groups and octanoyloxy groups; alkenoxy groups such as vinyloxy groups, isopropenoxy groups and 1-ethyl-2-methylvinyloxy groups; ketoxime groups such as dimethylketoxime groups, diethylketoxime groups, methylethylketoxime groups and methylisobutylketoxime groups; amino groups such as dimethylamino groups, diethylamino groups and dibutylamino groups; aminoxy groups such as dimethylaminoxy groups and diethylaminoxy groups; and amide groups such as N-methylacetamide groups and N-ethylacetamide groups, and of these, alkenoxy groups, ketoxime groups and alkoxy groups are preferred, and alkenoxy groups are particularly desirable.

Examples of other groups connected to the silicon atoms, in addition to the hydrolysable groups described above, include the same groups described for $R^1$ above, that is, alkyl groups such as methyl groups, ethyl groups, propyl groups, butyl groups, pentyl groups, hexyl groups, heptyl groups, octyl groups, nonyl groups, decyl groups and octadecyl groups; cycloalkyl groups such as cyclopentyl groups and cyclohexyl groups; alkenyl groups such as vinyl groups and allyl groups; aryl groups such as phenyl groups, tolyl groups, xylyl groups and naphthyl groups; aralkyl groups such as benzyl groups, phenethyl groups and phenylpropyl groups; and halogenated alkyl groups such as 3-chloropropyl groups and 3,3,3-trifluoropropyl groups.

Specific examples of the constituent (C) include ketoxime silanes such as methyltris(dimethylketoxime)silane, methyltris(methylethylketoxime)silane, ethyltris(methylethylketoxime)silane, methyltris(methylisobutylketoxime)silane and vinyltris(methylethylketoxime)silane; alkoxy silanes such as methyltrimethoxysilane, ethyltrimethoxysilane, vinyltrimethoxysilane, phenyltrimethoxysilane, methyltriethoxysilane, ethyltriethoxysilane, vinyltriethoxysilane, phenyltriethoxysilane, tetramethoxysilane and tetraethoxysilane; alkenoxysilanes such as methyltriisopropenoxysilane, vinyltriisopropenoxysilane and phenyltriisopropenoxysilane; and acetoxysilanes such as methyltriacetoxysilane and vinyltriacetoxysilane; as well as hydrolysis-condensation products of the above silanes.

These compounds may be used singularly, or in combinations of two or more compounds. Furthermore, depending on the intended application, compounds with 2 hydrolysable groups may also be incorporated within the composition in order to improve the elasticity and the like.

The quantity of the constituent (C) used is within a range from 0.1 to 30 parts by weight, and preferably from 1 to 15 parts by weight, per 100 parts by weight of the aforementioned constituent (A). If the quantity is less than 0.1 parts by weight then insufficient cross linking occurs, meaning a silicone rubber with the desired rubber elasticity cannot be obtained, whereas if the quantity exceeds 30 parts by weight, the mechanical characteristics of the product silicone rubber may be inferior.

Other Constituents

Where necessary, in addition to the aforementioned constituents (A) to (C), other constituents such as curing catalysts, adhesion assistants, and fillers may also be added to a composition of the present invention.

In the present invention, adhesion can be further improved by adding (D) fumed silica which has been surface treated with an organosilicon compound. Examples of the organosilicon compound include chlorosilanes such as methyltrichlorosilane, dimethyldichlorosilane and trimethylchlorosilane; alkoxysilanes such as methyltrimethoxysilane and vinylmethoxysilane; silazane compounds such as hexamethyldisilazane; and silicone compounds such as octamethylcyclotetrasiloxane.

The specific surface area of this surface treated fumed silica is preferably at least 50 $m^2/g$, and more preferably within a range from 100 to 400 $m^2/g$. Furthermore, the quantity of the constituent (D) is typically within a range from 1 to 50 parts by weight, and preferably from 3 to 30 parts by weight, per 100 parts by weight of the constituent (A).

In addition, examples of (E) curing catalysts which can be added for accelerating the condensation reaction include organic titanate esters such as tetrabutyl titanate, and tetraisopropyl titanate; organic titanium chelate compounds such as titanium diisopropoxybis(methylacetoacetate), titanium diisopropoxybis(ethylacetoacetate); organic aluminum compounds such as aluminum tris(acetylacetonate) and aluminum tris(ethylacetoacetate); organic zirconium compounds such as zirconium tetra(acetylacetonate) and zirconium tetrabutyrate; organotin compounds such as dibutyl tin dioctoate, dibutyl tin dilaurate and dibutyl tin di(2-ethylhexanoate); metal salts of organic carboxylic acids such as tin naphthenate, tin oleate, tin butyrate, cobalt naphthenate and zinc stearate; amine compounds such as hexylamine and dodecylamine phosphate, or the salts thereof; quaternary ammonium salts such as benzyltriethylammonium acetate; salts of alkali metals such as potassium acetate and lithium nitrate; dialkylhydroxylamines such as dimethylhydroxylamine and diethylhydroxylamine; guanidyl group-containing organosilicon compounds such as tetramethylguanidylpropyltrimethoxysilane. These compounds may be added singularly, or in combinations of two or more compounds.

In those cases in which a curing catalyst is added, there are no particular restrictions on the quantity of the catalyst, and an effective catalytic quantity is adequate. Typical quantities are from 0.001 to 20 parts by weight, and preferably from 0.01 to 10 parts by weight, per 100 parts by weight of the constituent (A).

In addition, (F) an adhesion assistant is also preferably added to a composition of the present invention. An adhesion assistant assists in improving the adhesion of the composition. Examples of the adhesion assistant include silane compounds comprising a group selected from amongst amino groups, epoxy groups, mercapto groups, acryloyloxy groups and methacryloyloxy groups linked to a silicon atom via a carbon atom, and also comprising a hydrolysable group bonded to a silicon atom, that is, a silane coupling agent. In addition, products of the reaction between silane coupling agents are also suitable.

Specific examples include silane coupling agents such as γ-aminopropyltriethoxysilane, γ-mercaptopropyltrimethoxysilane, γ-methacryloxypropyltrimethoxysilane and γ-glycidoxypropyltrimethoxysilane. Of these, amino group-containing silane coupling agents such as γ-aminopropyltriethoxysilane are preferred. These compounds may be added singularly, or in combinations of two or more compounds.

In those cases in which an adhesion assistant such as that described above is used, the quantity is typically within a range from 0.1 to 10 parts by weight, and preferably from 0.2 to 5 parts by weight, per 100 parts by weight of the constituent (A). If the quantity of the adhesion assistant is too large then the adhesion may deteriorate on long term storage of the composition.

In addition, non-surface treated fumed silica, wet silica, crystalline silica, and silicas treated with a lipophilic treatment agent such as dimethyldichlorosilane or hexamethyldisilazane; as well as fillers such as calcium carbonate and zinc carbonate, thixotropic improvement agents such as polyethers, mold prevention agents and antibacterial agents can also be added.

Substrate

When used as a sealing agent or an adhesive, a composition of the present invention produces a silicone rubber which displays good adhesion to substrates formed from synthetic resins, including acrylic resins such as polymethylmethacrylate (PMMA), polyamide resins such as nylon 6 and nylon 66, polybutylene terephthalate (PBT), polystyrene (PS) and polyphenylene sulfide (PPS).

Structure

Further, according to the present invention, a structure comprising a substrate formed from a synthetic resin described above, and a silicone rubber body bonded to said substrate and produced by curing the composition of the present invention, is also provided. This structure can be produced by applying the composition on a surface of the substrate and by curing the composition.

EXAMPLES

As follows is a description of specifics of the present invention using a series of examples. However, the present invention is in no way limited to the examples presented. In the examples below, the unit "parts" refers to "parts by weight", and the numbers recorded for the compositions shown in Table 1 also refer to parts by weight.

Example 1

To 100 parts of a polydimethylsiloxane with both terminals blocked with silanol groups and with a viscosity at 25° C. of 700 mm$^2$/s were added 400 parts of a Ni—Zn-based ferrite (Trade name: BSF-547, manufactured by Toda Kogyo Corp.) and 10 parts of a fumed silica which had been surface treated with dimethyldichlorosilane, and following mixing in a mixer (hereafter, the mixture thus obtained is termed "mixture A"), 10 parts of phenyltriisopropenoxysilane and 1 part of tetramethylguanidylpropyltrimethoxysilane were added, and the resulting mixture was mixed thoroughly under reduced pressure to yield a sample 1.

Example 2

To the mixture A were added 10 parts of phenyltriisopropenoxysilane, 1 part of tetramethylguanidylpropyltrimethoxysilane and 1 part of γ-aminopropyltriethoxysilane, and the resulting mixture was mixed thoroughly under reduced pressure to yield a sample 2.

Example 3

To the mixture A were added 9 parts of methyltris(methylethylketoxime)silane, 0.1 parts of dibutyl tin dioctoate and 1 part of γ-aminopropyltriethoxysilane, and the resulting mixture was mixed thoroughly under reduced pressure to yield a sample 3.

Example 4

To the mixture A were added 6 parts of methyltrimethoxysilane, 0.5 parts of tetramethylguanidylpropyltrimethoxysilane, 0.1 parts of dibutyl tin dioctoate and 1 part of γ-aminopropyltriethoxysilane, and the resulting mixture was mixed thoroughly under reduced pressure to yield a sample 4.

Example 5

With the exception of using a polydimethylsiloxane with both terminals blocked with silanol groups and with a viscosity at 25° C. of 5000 mm$^2$/s as the polydimethylsiloxane, a sample 5 was prepared in the same manner as the example 1.

Example 6

To 100 parts of a polydimethylsiloxane with both terminals blocked with trimethoxysilyl groups [—Si(OCH$_3$)$_3$]and with a viscosity at 25° C. of 20,000 mm²/s were added 400 parts of a Ni—Zn-based ferrite (BSF-547) and 10 parts of a fumed silica which had been surface treated with dimethyldichlorosilane, and following mixing in a mixer, 4 parts of methyltrimethoxysilane, 0.5 parts of tetramethylguanidylpropyltrimethoxysilane, 0.1 parts of dibutyl tin dioctoate and 1 part of γ-aminopropyltriethoxysilane were added, and the resulting mixture was mixed thoroughly under reduced pressure to yield a sample 6.

Comparative Example 1

To 100 parts of a polydimethylsiloxane with both terminals blocked with silanol groups and with a viscosity at 25° C. of 700 mm²/s were added 10 parts of a fumed silica which had been surface treated with dimethyldichlorosilane and 130 parts of a crystalline silica (Trade name: Crystalite VXS-2, manufactured by Tatsumori Ltd.), and following mixing in a mixer (hereafter, the mixture thus obtained is termed "mixture B"), 10 parts of phenyltriisopropenoxysilane and 1 part of tetramethylguanidylpropyltrimethoxysilane were added, and the resulting mixture was mixed thoroughly under reduced pressure to yield a sample 7.

Comparative Example 2

To the mixture B were added 10 parts of phenyltriisopropenoxysilane, 1 part of tetramethylguanidylpropyltrimethoxysilane and 1 part of γ-aminopropyltriethoxysilane, and the resulting mixture was mixed thoroughly under reduced pressure to yield a sample 8.

Comparative Example 3

To the mixture B were added 9 parts of methyltris(methylethylketoxime)silane, 0.1 parts of dibutyl tin dioctoate and 1 part of γ-aminopropyltriethoxysilane, and the resulting mixture was mixed thoroughly under reduced pressure to yield a sample 9.

Comparative Example 4

To the mixture B were added 6 parts of methyltrimethoxysilane, 0.5 parts of tetramethylguanidylpropyltrimethoxysilane, 0.1 parts of dibutyl tin dioctoate and 1 part of γ-aminopropyltriethoxysilane, and the resulting mixture was mixed thoroughly under reduced pressure to yield a sample 10.

Comparative Example 5

With the exception of using a polydimethylsiloxane with both terminals blocked with silanol groups and with a viscosity at 25° C. of 5000 mm²/s as the polydimethylsiloxane, a sample 11 was prepared in the same manner as the comparative example 1.

Comparative Example 6

With the exception of changing the quantity of the Ni—Zn-based ferrite (BSF-547) from 400 parts to 3 parts, a sample 12 was prepared in the same manner as Example 1.

Comparative Example 7

With the exception of changing the quantity of the Ni—Zn-based ferrite (BSF-547) from 400 parts to 10 parts, a sample 12 was prepared in the same manner as Example 1.

Comparative Example 8

To 100 parts of a polydimethylsiloxane with both terminals blocked with silanol groups and with a viscosity at 25° C. of 700 mm²/s were added 3 parts of a Ni—Zn-based ferrite (BSF-547), 10 parts of a fumed silica which had been surface treated with dimethyldichlorosilane, and 130 parts of a crystalline silica (Tradename: Crystalite VXS-2, manufactured by Tatsumori Ltd.), and following mixing in a mixer, 10 parts of phenyltriisopropenoxysilane and 1 part of tetramethylguanidylpropyltrimethoxysilane were added, and the resulting mixture was mixed thoroughly under reduced pressure to yield a sample 14.

The composition of each of the sample of the examples is given in Table 1, and that of each of the sample of the comparative examples is given in Table 2.

Evaluations

Physical Properties: Each sample was formed into a sheet of thickness 2 mm, and then cured by standing for 1 week in an atmosphere of 23±2° C. and 50±5% RH. Measurements of the physical properties of the thus obtained cured sheet were conducted in accordance with JIS K 6249. The results of these measurements are shown in Table 1 and Table 2.

Adhesion: Each sample was applied to the surface of each of the different substrate types listed in Table 1, using an adhesion surface area of 20 mm×30 mm and a sample thickness of 5 mm, and was then cured by standing for 1 week in an atmosphere of 23±2° C. and 50±5% RH, thereby forming a test specimen (cured product). These test specimens were then pulled, by hand, in a direction parallel to the substrate surface, and the results of this pulling operation were observed.

In Table 1 and Table 2, those specimens which remained bonded and did not suffer any separation are indicated with the symbol o, whereas those specimens which separated are indicated with the symbol X.

TABLE 1

| | | Examples | | | | | |
|---|---|---|---|---|---|---|---|
| Sample No. | | 1 | 2 | 3 | 4 | 5 | 6 |
| Composition | | | | | | | |
| silanol blocked dimethylpolysiloxane (700 mm²/s) | | 100 | 100 | 100 | 100 | | |
| silanol blocked dimethylpolysiloxane (5000 mm²/s) | | | | | | 100 | |

TABLE 1-continued

| | Examples | | | | | |
|---|---|---|---|---|---|---|
| Sample No. | 1 | 2 | 3 | 4 | 5 | 6 |
| trimethoxysilyl blocked dimethylpolysiloxane (20,000 mm$^2$/s) | | | | | | 100 |
| ferrite | 400 | 400 | 400 | 400 | 400 | 400 |
| crystalline silica | | | | | | |
| phenyltriisopropenoxysilane | 10 | 10 | | | 10 | |
| methyltris(methylethylketoxime)silane | | | 9 | | | |
| methyltrimethoxysilane | | | | 6 | | 4 |
| tetramethylguanidylpropyltrimethoxysilane | 1 | 1 | | 0.5 | 1 | |
| dibutyl tin dioctate | | | 0.1 | 0.1 | | 0.1 |
| γ-aminopropyltriethoxysilane | | 1 | 1 | 1 | | 1 |
| Physical properties | | | | | | |
| Hardness (durometer A) | 72 | 73 | 80 | 77 | 70 | 65 |
| Breaking elongation (%) | 80 | 60 | 40 | 40 | 100 | 150 |
| Tensile strength (MPa) | 1.9 | 2.3 | 3 | 3.2 | 2.1 | 2.0 |
| Adhesion | | | | | | |
| acrylic resin | ○ | ○ | X | ○ | ○ | ○ |
| nylon 6 | ○ | ○ | ○ | ○ | ○ | ○ |
| nylon 66 | ○ | ○ | ○ | ○ | ○ | ○ |
| PBT | ○ | ○ | ○ | ○ | ○ | ○ |
| PS | ○ | ○ | ○ | ○ | ○ | ○ |
| PPS | ○ | ○ | ○ | X | ○ | X |

TABLE 2

| | Comparative Examples | | | | | | | |
|---|---|---|---|---|---|---|---|---|
| Sample No. | 7 | 8 | 9 | 10 | 11 | 12 | 13 | 14 |
| Composition | | | | | | | | |
| silanol blocked dimethylpolysiloxane (700 mm$^2$/s) | 100 | 100 | 100 | 100 | | 100 | 100 | 100 |
| silanol blocked dimethylpolysiloxane (5000 mm$^2$/s) | | | | | 100 | | | |
| trimethoxysilyl blocked dimethylpolysiloxane (20,000 mm$^2$/s) | | | | | | | | |
| ferrite | | | | | | 3 | 10 | 3 |
| crystalline silica | 130 | 130 | 130 | 130 | 130 | | | 130 |
| phenyltriisopropenoxysilane | 10 | 10 | | | 10 | 10 | 10 | 10 |
| methyltris(methylethylketoxime)silane | | | 9 | | | | | |
| methyltrimethoxysilane | | | | 6 | | | | |
| tetramethylguanidylpropyltrimethoxysilane | 1 | 1 | | 0.5 | 1 | 1 | 1 | 1 |
| dibutyl tin dioctate | | | 0.1 | 0.1 | | | | |
| γ-aminopropyltriethoxysilane | | 1 | 1 | 1 | | | | |
| Physical properties | | | | | | | | |
| Hardness (durometer A) | 70 | 67 | 76 | 69 | 65 | 15 | 19 | 71 |
| Breaking elongation (%) | 90 | 100 | 90 | 100 | 130 | 120 | 110 | 90 |
| Tensile strength (MPa) | 3.9 | 4.4 | 5.6 | 4.8 | 4.2 | 0.3 | 0.4 | 4.0 |
| Adhesion | | | | | | | | |
| acrylic resin | X | X | X | X | X | X | X | X |
| nylon 6 | X | X | X | X | X | X | X | X |
| nylon 66 | X | X | X | X | X | X | X | X |
| PBT | X | X | X | X | X | X | X | X |
| PS | X | X | X | X | X | X | X | X |
| PPS | X | X | X | X | X | X | X | X |

The room-temperature curable organopolysiloxane compositions of the present invention produced silicone rubbers which displayed excellent adhesion to the synthetic resin substrates. These silicone rubbers are particularly useful as sealing materials used in areas which utilize water, construction sealing materials, or for the bonding or securing of electrical components or electronic components.

What is claimed is:

1. A room-temperature curable organopolysiloxane composition comprising:

(A) 100 parts by weight of at least one straight chain organopolysiloxane selected from the group consisting of a straight chain organopolysiloxane represented by a general formula (1) shown below and a straight chain organopolysiloxane represented by a general formula (2) shown below, $$HO(SiR^1{}_2O)_nH \qquad (1)$$

wherein, each R$^1$ represents, independently, an unsubstituted or substituted monovalent hydrocarbon group, and n represents a number which results in a viscosity at 25° C. for this organopolysiloxane within a range from 25 to 1,000,000 mm²/S,

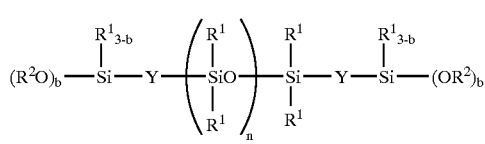

(2)

wherein, $R^1$ is as defined above, each $R^2$ represents, independently, a monovalent hydrocarbon group or an alkoxy substituted monovalent hydrocarbon group, Y represents an oxygen atom or a bivalent hydrocarbon group, b represents either 2 or 3, and n represents a number which results in a viscosity at 25° C. for this organopolysiloxane within a range from 25 to 1,000,000 mm²/s;

(B) 50 to 1000 parts by weight of a ferrite; and (C) 0.1 to 30 parts by weight of a silane compound with at least 3 hydrolysable groups bonded to silicon atoms within each molecule, and/or a partial hydrolysis-condensation product thereof.

2. The composition according to claim 1, wherein said ferrite (B) is a ferrite selected from the group consisting of soft magnetic ferrites and hard magnetic ferrites.

3. The composition according to claim 1, wherein said ferrite (B) is a Ni—Zn-based ferrite.

4. The composition according to claim 1, wherein said hydrolysable groups of said constituent (C) are at least one group selected from the group consisting of alkenoxy groups, ketoxime groups and alkoxy groups.

5. The composition according to claim 1, wherein said constituent (C) is methyltrimethoxysilane, phenyltriisopropenoxysilane or methyltris(methylethylketoxime)silane.

6. The composition according to claim 1, further comprising:

(D) a fine powder of a fumed silica which has been surface treated with an organosilicon compound.

7. The composition according to claim 1, further comprising:

(E) a curing catalyst for accelerating a condensation reaction.

8. The composition according to claim 1, further comprising:

(F) an adhesion assistant.

9. The composition according to claim 1, used for bonding to a substrate formed from a synthetic resin.

10. An adhesive composition comprising the composition according to claim 1.

11. A structure comprising a substrate formed from acrylic resin, polyamide resin, polybutylene terephthalate, polystyrene or polyphenylene sulfide, and a silicone rubber body bonded to said substrate and produced by curing the composition according to claim 1.

* * * * *